United States Patent [19]

Langhoff et al.

[11] Patent Number: 4,514,191
[45] Date of Patent: Apr. 30, 1985

[54] SLAG REMOVAL APPARATUS

[75] Inventors: Josef Langhoff, Dinslaken-Hisfeld; Jürgen Seipenbusch, Essen, both of Fed. Rep. of Germany

[73] Assignee: Ruhrkohle AG, Essen, Fed. Rep. of Germany

[21] Appl. No.: 424,639

[22] Filed: Sep. 27, 1982

Related U.S. Application Data

[62] Division of Ser. No. 216,826, Dec. 15, 1980, Pat. No. 4,425,254.

Foreign Application Priority Data

Jun. 29, 1978 [DE] Fed. Rep. of Germany ....... 2828562

[51] Int. Cl.³ .............................................. C10J 3/52
[52] U.S. Cl. ........................................ 48/77; 45/69; 110/171; 120/7 R
[58] Field of Search ............... 48/206, 197 R, DIG. 2, 48/69, 77; 110/171; 122/7 R

[56] References Cited

U.S. PATENT DOCUMENTS

| | | | |
|---|---|---|---|
| 2,016,928 | 10/1935 | Lombardi | 110/171 |
| 2,871,114 | 1/1959 | Eastman | 48/DIG. 2 |
| 2,971,830 | 2/1961 | Kawai et al. | 48/206 |
| 3,232,727 | 2/1966 | Guptill et al. | 48/215 |
| 3,929,429 | 12/1975 | Crouch | 48/197 R |
| 3,976,443 | 8/1976 | Paull et al. | 48/197 R |
| 4,195,978 | 4/1980 | Anderson | 48/DIG. 2 |

*Primary Examiner*—Peter Kratz

[57] ABSTRACT

In coal-gasification apparatus, slag particles received in free-fall by a water bath at the bottom of the reactor, or of a waste heat boiler associated therewith, are wetted with oil, or another additive agent. As a result they become bonded together. This prevents floating and facilitates sinking of the slag for removal from below the water bath. An annular duct having nozzles at different angles is used to spray the slag particles with oil near the surface of the water bath. The nozzles create a turbulence at the surface, thereby increasing the effect on the slag particles. A lock hopper fluidly communicates with the water bath right below, and collects the slag particles. The removed slag is classified before being used or recycled by feedback into the reactor together with coal dust, water and oxygen as components for the reactive process.

27 Claims, 5 Drawing Figures

SLAG REMOVAL APPARATUS

This is a division of application Ser. No. 06/216,826, filed Dec. 15, 1980 now U.S. Pat. No. 4,425,254.

BACKGROUND OF THE INVENTION

The invention relates to method and apparatus for the preparation of solid from fluid in general, and more particularly to the removal of slag from a coal-gasification reactor.

Typically, in a coal-gasification plant where the slag evolving in the process falls in the furnace, or in the waste heat boiler associated thereto, the slag collects into a water bath provided at the base of the furnace, or of the associated waste heat boiler. While the slag in free-fall is to be removed at the bottom of the reactor, e.g. of the furnace or of the associated waste heat boiler, a lock hopper is connected beneath the reactor to collect the accumulated slag. The purpose of the water bath at the bottom of the furnace (in the absence of a waste heat boiler), or at the bottom of a waste heat boiler when it exists, is to provide a seal maintaining the internal temperature and pressure in the reactor while the slag is removed. The slag hopper operates as a lock between an upper and a lower door. The upper door admits the slag through the water bath when it is opened and the lower door is closed. Slag recovery is when the lower door is opened and the upper door is closed. A successful operation depends, though, upon the slag sinking right through the water bath onto the upper door of the lock hopper.

Combustion is the most important factor in a coal-gasification process. When combustion is incomplete, there remains in the water bath a floatable slag which does not separate, e.g., which does not sink to the bottom. Therefore, the operation of the reactor has to be interrupted periodically in order that the floatable slag can be removed. In such case, removal has to be done manually which is quite disadvantageous in itself. Such interruption of the reactor is also a drawback for a continuous chemical process.

An object of the present invention is to combine continuous operation of a coal-gasification reactor with slag removal by making such removal possible without it being manual.

The invention stems from the concept of preventing floatability of the slag. According to the invention, an additive is used in such a way that the slag particles will stick to each other. As a result, slag particles of floatable weight and particles of non-floatable weight will unite to form larger particles, whereby sinking of the slag is ensured. Heavier slag particles, because they are attached to the floatable ones, tend to entrain the lighter slag particles to the bottom.

According to still another feature of the invention, the falling slag is at least in part recycled by mixing with the reactor charging materials. This provides several advantages. In particular, an improved performance of the reactor, an extended combustion of the slag particles which were incompletely burnt and reuse of the added oil are obtained.

Preferably, the slag is fed back as charging material after passing through a classifier in the form of a grader, or a separator. As a result, the slag particles which are fully or mostly burnt can be separated. This is achieved by imparting to the particles, after sinking through the water bath from the boiler or its associated waste heat boiler, a horizontal motion right above a series of funnels or successive surfaces of the classifier. The slag particles of larger weight fall with a relatively large vertical velocity into the closest funnel, or are lodged onto the closest surface in the direction of travel, while the lighter slag particles fall at more or less remote distances into different other funnels, or settle onto different other surfaces, in accordance with their respective weights.

SUMMARY OF THE INVENTION

The invention resides in method and apparatus for removing slag particles evolving from a coal-gasification process by reacting coal in a reaction chamber with a gasification medium at a predetermined reactive pressure and temperature levels. In a continuous process, operative conditions are maintained and isolated from the outside by a bath of water forming a seal at the bottom of the reactor. The slag particles fall freely into the water bath and a wetting agent is projected against the particles to cause them to agglomerate, thus facilitating their sinking to the bottom of the water where they can be removed without interrupting the gasification process. The wetting agent preferably is oil, or even heavy heating oil, which may have been preheated by the gas product.

In the preferred embodiment, a perforated annular duct projects the oil onto the surface of the water bath in such a way that the surface is strongly agitated, thereby increasing the wetting action. Jets of oil are formed in two rows with different angles from one row to the other. Also, the jets of oil are converging toward the central axis of the water bath. The annular duct, whenever preferable, may be disposed just below the surface, rather than right above it.

A lock hopper just below the water bath permits intermittent removal of the accumulated slag particles without necessitating any interruption of the reactive process. When the reactor includes a waste heat boiler associated with the reactor chamber, the water bath is contained at the bottom of the waste heat boiler. The slag particles fall freely through it into the water bath and the oil is sprayed near the surface of the water, as earlier stated.

DESCRIPTION OF THE PREFERRED EMBODIMENTS

The invention relates to separation of solid and fluid in general, and more particularly to method and apparatus for the recovery of slag in a slag-forming coal gasification process.

In many coal gasification installations, coal fed in particulated form is reacted with a gasification medium generally in liquid form. If the temperature is near the softening point of the ash particles evolving from the reaction, these tend to agglomerate and increase in size until, as a slag, they are heavy enough to fall freely to the bottom of the reactor where they can be removed. However, in order to preserve a differential temperature and a differential pressure between conditions inside and conditions outside the reactor, a water seal is, in general, provided at the bottom of the reactor so that the slag particles, in fact, sink through the water. The reactor may comprise a main boiler and a waste heat boiler disposed below the main boiler. Then, the water bath is at the bottom of the waste heat boiler. The quenched gas product is carried away from the waste heat boiler above the water while the solid slag collects below the surface. A lock hopper disposed beneath the water seal collects the accumulated slag between sash doors when one is open at the top, the other closed at the bottom. Once the lock hopper is full, the sash doors are set in the opposite positions and the slag is removed.

Although the invention is capable of other applications, it will be described hereinafter, for the purpose of illustration only, in the context of an oxygen-steam coal gasification process for the production of synthesis gas. As generally known, carbon in the coal reacts with steam in accordance with the reaction formula $C + H_2O \rightarrow CO + H_2$. In the process oxygen is added to burn some of the coal, thereby raising the temperature to the reaction level. The process is continuous. Synthesis gas is extracted while slag collects by gravity and is removed or recycled for further use.

Figure 1:
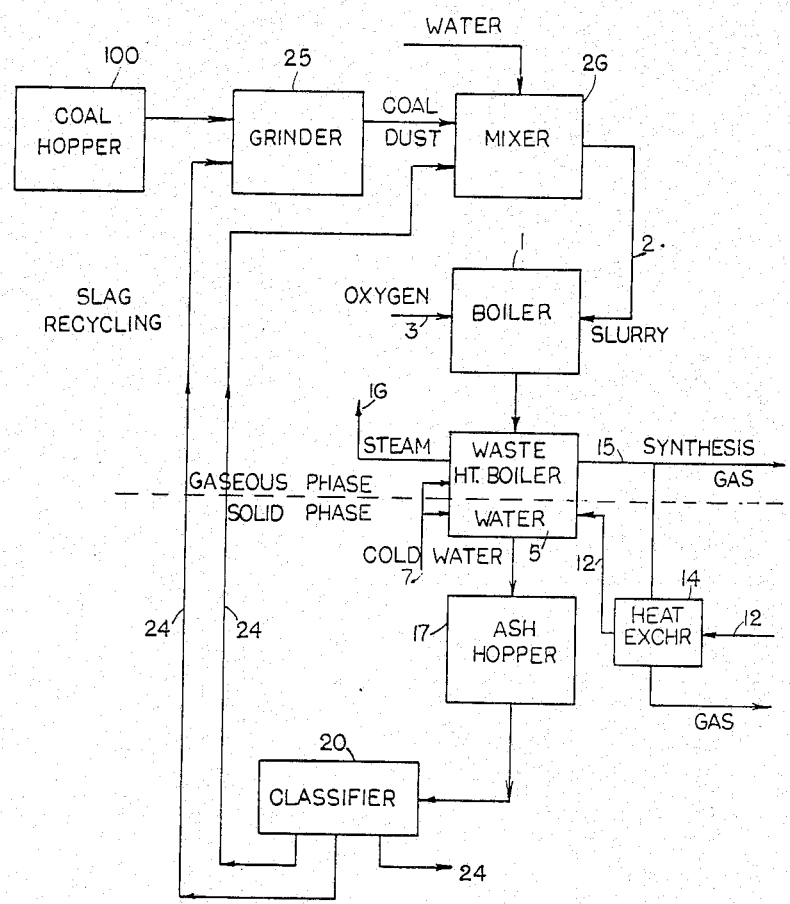
FIG. 1 shows diagrammatically a slag-forming coal gasification process embodying the present invention.

Referring to FIG. 1, coal from a coal hopper (100) is passed into a grinder (25) where it is reduced to coal dust. In a mixer (26) the coal dust is mixed with water to form a coal suspension, or slurry. The slurry is fed, via line 2, from the top into a boiler, or furnace (1), in which oxygen is injected through an inlet (3), also from the top. The reaction takes place at a temperature of about 1400° C. and under a pressure of 30 bar. The reaction yields synthesis gas having a high amount of carbon monoxide and free hydrogen. This synthesis gas is an important chemical raw material for the industry. The gas product is quenched, after leaving the main boiler (1), in a waste heat boiler (4) and the exhaust (15) carries away the synthesis gas as well as any volatile portion of the slag. Cold water is supplied by an inlet (7) to quench the gases and generate steam. Water is also supplied to maintain the water bath (5) at the bottom of waste heat boiler (4), thus establishing a predetermined water level in the horizontal plane XY which separates the gaseous phase from the solid phase in the slag recovery process according to the present invention. Steam generated in the waste heat boiler is evacuated by an outlet (16). A lock hopper (17), beneath the waste heat boiler (4) and the water bath (5), collects the slag particles in a free-fall as they sink in the water. An upper sash door (not shown) is opened when the lock hopper is empty, thereby admitting the slag which collects against a lower sash door (not shown) which is closed at this time. When the slag is to be removed from the lock hopper (14), the upper sash door is closed, and the lower sash door is opened. The recovered slag passes through a classifier (20) including separate receptacles, or funnels (19) having respective outlets (24), which may be connected to the mixer (26) for recycling as charging material directly or through the coal grinder (25). Otherwise the slag may be carried away by one of the outlets (24) for further use.

Figure 2:
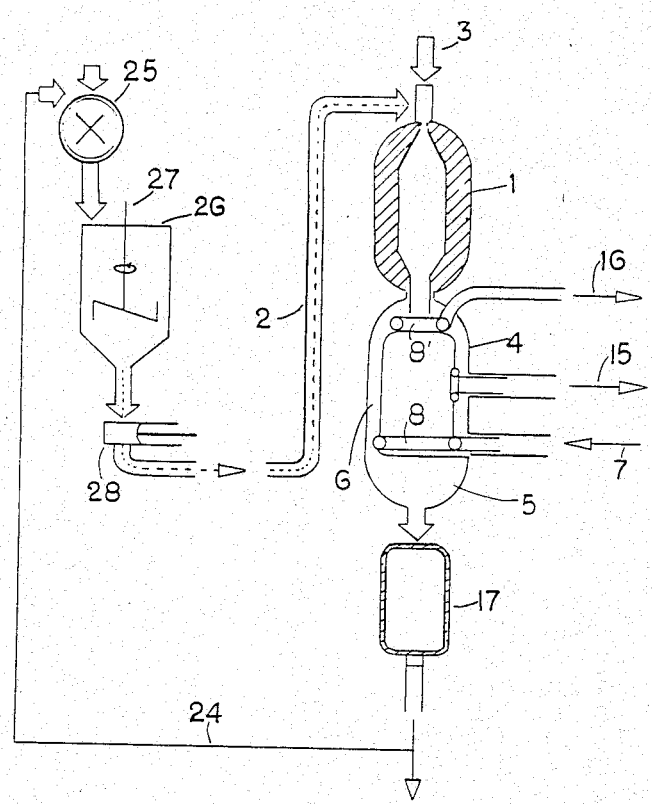
FIG. 2 is a schematic view of a particular reactor installation using the present invention.

Referring to FIG. 2, a suspension of coal and water is introduced at the top of a boiler (1) through a pipe (2) under the pressure of a pump (28). The coal used is in the form of coal dust, after reduction by a grinder (25). The coal dust is then mixed with water by a stirrer (27). The coal-water suspension is continuously extracted by a pump (28) at the bottom of mixer (27) and fed through pipe (2).

In addition to the coal-water suspension, oxygen is injected at the top of boiler (1) through a pipe (3). In the boiler, the water injected with the coal is vaporized as the coal is being brought to the temperature of reaction. At a temperature of about 1400° C. and a pressure of about 30 bar, the coal, the oxygen and the steam generate mainly the so-called synthesis gas. Synthesis gas substantially consists of carbon monoxide and liberated hydrogen. It is an important chemical raw material.

The generated gas product passes from boiler (1) into waste heat boiler (4) which is disposed under boiler (1). The waste heat boiler (4) receives also slag particles entrained with the gas at the exhaust of boiler (1). The falling slag is first in fluid form. It collects into a water bath (5) located at the base of the waste heat boiler (4).

In the waste heat boiler (4) the generated synthesis gas experiences a first cooling step. To this end the waste heat boiler (4) is provided with a tubular wall. This tubular wall has at the lower side a cold-water inlet (7) and at the upper side an outlet (16) for the water after it has been warmed up into a mixture of steam and water. The cold water from inlet (7) discharges into an annular duct (8). Along the annular duct extend a plurality of regularly distributed vertical cooling tubes (9). Through the cooling tubes (9) (of which two are shown, the others being schematically represented only by their axes), the cold water rises as a result of being heated. Accordingly, the cooling tubes (9) which are oriented upward connect into another annular duct (8') having an outlet (16).

Figure 3:
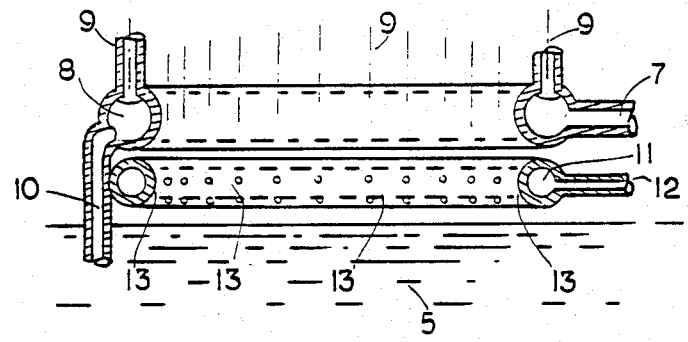

As shown in FIG. 3, in addition to the upwardly directed cooling tubes (9) the annular duct (8) possesses an outlet tube (10) oriented downward. The outlet tube (10) is disposed diametrically opposite to the cold water inlet (7) of annular duct (8) and possesses a cross-section to flow which is commensurate with the cross-section of the cooling tubes (9) in order to permit continuous flow of water through the outlet tube (10).

Also, as shown in FIG. 3, the outlet tube (10) passes to the outside of a second annular duct (11) which is disposed exactly below the annular duct (6). Like annular duct (8), annular duct (11) is provided with an inlet tube (12). Heavy heating oil, preferably, is forced under pressure through inlet tube (12) into annular duct (11). The heavy heating oil is ejected radially and centripetally from duct (11) through a plurality of regularly distributed openings, or nozzles (13), in the form of jets directed onto the surface of the water bath (5).

Nozzles (13) are disposed in two rows in two locations one above the other along two inner circles at the surface of annular duct (11). They are oriented at different angles to the surface of the water bath (5), these angles being common to the respective rows. The effect of such an arrangement is to create a turbulence with the oil projected from the annular duct (11) onto the slag particles which have fallen in the middle of the surface of the bath, thereby to set the particles in motion one against the other. The individual slag particles under such turbulent relative motions receive an increased exposure to the heavy heating oil, providing maximum effect as an additive.

Annular duct (11) is near the surface of the bath. Moreover, the nozzles (13) are large enough to provide compact jets of oil. These two measures tend to prevent the oil from getting inflamed and avoid any significant loss of oil.

In order to facilitate the flow of heavy oil through tubes (11) and (12) and its ejection from nozzles (13), flowability is increased by preheating followed by subsequent heating in the waste heat boiler (4) and the annular duct (11).

Figure 4:
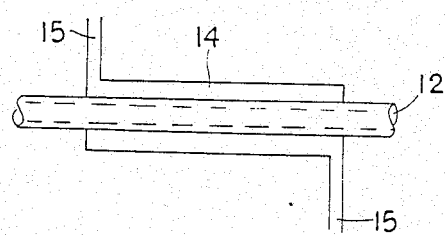
FIGS. 3 to 5 are detailed views of structural arrangements, according to the present invention, which are part of the installation shown in FIG. 2.

Preheating is effected on inlet tube (12) outside the waste heat boiler (4). To this effect, the inlet tube (12), as shown in FIG. 4, is passed through a heat exchanger (14) surrounding tube (12). Heat exchanger (14) has a tubular configuration around inlet tube (12) and is supplied with the gas exhaust from waste heat boiler (4) via pipe (15), thus carrying some of the synthesis gas generated in the reactor.

Synthesis gas should preferably be subjected to a controlled cooling in order to prevent undesirable secondary reactions. The cooling effect of the heat exchanger (14) when preheating the heavy heating oil would not be sufficient, though, to provide the necessary cooling for the gas product. Therefore, the exhaust gases are cooled externally in a water-cooled quencher, not shown. The resulting steam is used, as needed, together with the steam discharged by pipe (16) from the waste heat boiler (FIG. 2).

Cooling of the synthesis gas effected by direct contact with water in a special step. Such water contacting is achieved by spraying; the so-called quenching operation. Quenching has the effect of freeing the synthesis gas from the undesirable ash particles. The water-ash mixture resulting from such exhaust gas washing is thickened afterwards so that the water separated by the thickening step can be fed back for quenching. What remains is an ash-pap which can be mixed with the charging material and fed into the reactor. Such mixing of the slag with the charging material facilitates reaching the high temperature required for gasification.

Figure 5:
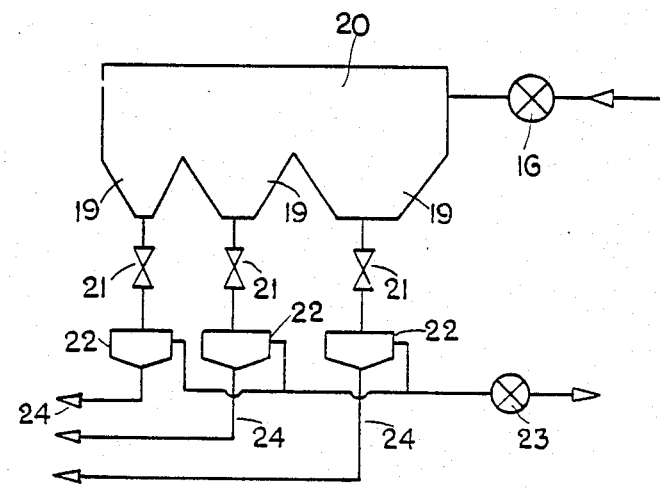

The slag collects in clumps within the water bath (5) at the base of the waste heat boiler (4). It then passes into a lock hopper (17). The latter is directly below the waste heat boiler (4) so that when it is opened it fills up progressively. Then the lock is closed and the slag, which continues to fall from the reactor in operation, accumulates before the entry of the lock hopper at the bottom of the water bath. With the entry of the lock closed and the exit opened, the slag is removed under low pressure without interfering with the operative pressure of the reactor. A pump (18) is provided to draw the slag. Pump (18) also forces the slag horizontally into a container (20) including several funnels (19), as shown in FIG. 5. The heavier slag particles fall directly into the first of the funnels (19), e.g., the one close to the entrance of the container. The lighter slag particles, because they have a slower fall, reach a more or less remote funner (19). Since the weight is indicative of the degree of burning of the slag particles, the particles are automatically sorted out in accordance with the degree of combustion. The slag can be removed from any of the funnels (19). Necessary control is provided by a slide valve (21).

From funnels (19) the slag particles go into a thickener (22). The water liberated during such thickening step is extracted by a pump (21) and fed back to the water supply. The thickened slag is available for various uses. At least a portion of the slag is recycled and mixed with the charging materials of the reactor. To this effect, at least one of the pipes (24) coming from the thickener (22) leads to an inlet of the grinder (25) where the slag is ground with the other charging materials. A pump connected with pipe (24), which may include a piston, or a paddle wheel, is provided for ensuring sufficient flow of the slag within pipe (24).

Recycling may also be performed by feeding back the thickened ash-pap through a pipe. After quenching, though, there is no need to grind the ash-pap. It can, therefore, be fed directly into the mixer (26) which, in FIG. 2, is shown with its stirring member designated by reference numeral (26).

The pump (28), which is connected to the stirrer (26) and forces the charging material into the boiler, works in relation to the operating pressure required for the reactor.

Where the reactor has a water bath integrated with the boiler and it is not practical to supply oil from above the surface of the bath, the oil is supplied through the water bath (5). In such case the annular duct (11) is no longer directly above, but rather directly under the surface of the water. Then it is easy to raise the surface of the bath by merely increasing the water supply.

What is claimed is:

1. An apparatus for the removal of slag particles evolving in a coal-gasification process including a reactor with coal inlet means and oxygen containing gas inlet means located at the top of said reactor for reaction of coal with a gasification medium at predetermined reactive pressure and temperature levels located above a water bath means contained at the bottom of said reactor, means for removing the generated gas from said reactor above said water bath means, wherein said slag particles collect by free-fall through said water bath means to the bottom thereof, said apparatus comprising: a water bath means located substantially at a bottom region of said reactor; annular duct means connected to a source of oil additive agent and having nozzles positioned for spraying the additive agent transversely of a fall trajectory of said slag particles for wetting the slag particles and causing the slag particles to stick to one another, said spraying means being substantially in a region of said water bath means, the apparatus including a water duct means located superjacent to said annular means for feeding water to said water bath means; and means connected at the bottom of said water bath means for removing the collected slag particles.

2. The apparatus of claim 1, with the nozzles each having a wide enough opening, to provide a compact jet of oil.

3. The apparatus of claim 1 with said additive agent spraying means including duct means disposed in proximity to the surface of said water bath means in use.

4. The apparatus of claim 2 with said water duct means further including a water spout means to supply water to said water bath means.

5. The apparatus of claim 2 wherein said agent spraying duct means includes nozzles directed toward the surface of said water bath means.

6. The apparatus of claim 5 with said nozzles being at different angles to the surface of said water bath means.

7. The apparatus of claim 6 with said nozzles being disposed substantially radially about the center of said water bath means.

8. The apparatus of claim 6 with said nozzles being in two rows, each row having a common angle to the surface of said water bath means.

9. The apparatus of claim 5 with said additive agent spraying means comprising annular duct means disposed above the surface of said water bath means about a vertical axis thereof.

10. The apparatus of claim 9 with said nozzles defining openings directed for impact of said additive agent against the surface of said water bath means.

11. The apparatus of claim 2 with said agent spraying means being disposed above the surface of said water bath means.

12. The apparatus of claim 2 with said agent spraying means being disposed below the surface of said water bath means.

13. The apparatus of claim 2 including preheating means to preheat said additive agent.

14. The apparatus of claim 2, with said preheater being a heat exchanger associated with an exhaust of said coal reactor.

15. The apparatus of claim 2 with said reactor including a main boiler supplied with coal and said gasification medium, and a waste heat boiler disposed below said main boiler for receiving slag particles and generated gas, said water bath means being contained at the bottom of said waste heat boiler, with said agent spraying means being mounted in said waste heat boiler near the surface of said water bath means.

16. The apparatus of claim 15 with cooling means and means for exhausting said generated gas, said cooling means and gas exhausting means being associated with said waste heat boiler.

17. The apparatus of claim 16 with said agent spraying means being disposed between said cooling means and the surface of said water bath means.

18. The apparatus of claim 17 with said main boiler and waste heat boiler being mounted about a common vertical axis, and said cooling means and duct means being also mounted about said axis, said slag particles having a falling trajectory across said cooling means and duct means.

19. The apparatus of claim 18 with said cooling means and duct means being substantially annular, defining a free space for said slag particle trajectories.

20. The apparatus of claim 1 including a classifier means associated with said reactor for classifying and sizing the removed slag particles.

21. The apparatus of claim 20 including lock hopper means associated with the bottom of said water bath means for collecting said slag particles through said wafer bath means, said classifier means being connected to be operative with said lock hopper means for removing the slag particles therefrom.

22. The apparatus of claim 21 including pipe means for imparting motion to the removed slag particles horizontally across said classifier means to separate slag particles according to weight.

23. The apparatus of claim 22 including means to feedback at least in part the removed slag particles into said reactor.

24. The apparatus of claim 22, including a grinder, with said pipe means also adding charging material and being connected to said grinder for grinding the reactor charging materials.

25. The apparatus of claim 24, including a classifier having a container provided with funnels disposed horizontally along a longitudinal axis and running horizontally, interposed at an entry point of said slag particles into said pipe.

26. The apparatus of claim 25, with each said funnel being provided with a slide valve.

27. The apparatus of claim 26, including a fluid extractor and thickener associated with at least some of said slide valves.

* * * * *